United States Patent
Chen et al.

(10) Patent No.: US 7,852,963 B2
(45) Date of Patent: Dec. 14, 2010

(54) METHOD AND SYSTEM FOR PREDICTING SIGNAL POWER TO INTERFERENCE METRIC

(75) Inventors: Tai-Ann Chen, Parsippany, NJ (US); Martin Howard Meyers, Montclair, NJ (US); Susan Wu Sanders, Bridgewater, NJ (US); Carl Francis Weaver, Township of Hanover, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 854 days.

(21) Appl. No.: 10/793,013

(22) Filed: Mar. 5, 2004

(65) Prior Publication Data

US 2005/0195924 A1    Sep. 8, 2005

(51) Int. Cl.
H04L 27/06    (2006.01)
(52) U.S. Cl. .................... 375/267; 455/101
(58) Field of Classification Search .............. 375/343, 375/346, 295, 146, 304, 267, 299; 455/226.3, 455/226.2, 226.1, 67.11, 562.1, 101
See application file for complete search history.

(56) References Cited

U.S. PATENT DOCUMENTS

| | | | | |
|---|---|---|---|---|
| 5,903,554 | A * | 5/1999 | Saints | 370/342 |
| 6,075,974 | A * | 6/2000 | Saints et al. | 455/69 |
| 6,397,083 | B2 * | 5/2002 | Martin et al. | 455/562.1 |
| 6,426,971 | B1 * | 7/2002 | Wu et al. | 375/227 |
| 6,519,705 | B1 * | 2/2003 | Leung | 713/300 |
| 6,577,690 | B1 * | 6/2003 | Barman et al. | 375/354 |
| 6,847,809 | B2 * | 1/2005 | Gurelli et al. | 455/226.3 |
| 6,996,385 | B2 * | 2/2006 | Messier et al. | 455/226.3 |
| 7,006,800 | B1 * | 2/2006 | Lashkarian et al. | 455/67.11 |
| 2003/0108087 | A1 * | 6/2003 | Shperling et al. | 375/146 |
| 2005/0053169 | A1 * | 3/2005 | Jia et al. | 375/267 |

OTHER PUBLICATIONS

M.Münster, L.Hanzo, MMSE Channel Prediction Assisted Symbol-by-symbol Adaptive OFDM, Dept. of ECS, University of Southampton, 2002 IEEE.*
Alberto Gutierrez, Steven Baines and Damian Bevan, "An Introduction to PSTD for IS-95 and cdma2000", Nortel Networks, 1999 IEEE.*
Wen-Yi Kuo and Michael P.Fitz, "Design and Analysis of Transmitter Diversity using Intentional Frequency Offset for Wireless Communications", Nov. 1997, IEEE.*
Shengli Zhou and Georgios B. Giannakis, "How Accurate Channel Prediction Needs to be for Transmit-Beamforming With Adaptive Modulation Over Rayleigh MIMO Channels?", 2003 IEEE.*

(Continued)

*Primary Examiner*—Chieh M Fan
*Assistant Examiner*—Aristocratis Fotakis
(74) *Attorney, Agent, or Firm*—Harness, Dickey & Pierce

(57) ABSTRACT

A method and system for predicting a signal power to interference metric for a communication channel in a coverage area of a phase sweep diversity communication system are provided. In the method, a signal power to interference metric for the communication channel is predicted based on a sweep frequency for transmissions in the coverage area. The signal power to interference metric predicted may be a carrier-to-interference ratio or a signal-to-noise plus interference ratio.

16 Claims, 7 Drawing Sheets

OTHER PUBLICATIONS

Shengli Zhou and Georgios B. Giannakis, "How Accurate Channel Prediction Needs to be for Adaptive Modulation in Rayleigh MIMO Channels?", Univ. of Minnesota, Apr. 2003, IEEE.*

Edward Mah, "Phase Sweeping Transmit Diversity with Fading Resistant Constellations", Thesis for the degree of Master of Applied Science, Graduate Department of Electrical and Computer Engineering, University of Toronto, 1998.*

Wen-yi Kuo and Michael P.Fitz, "Design and Analysis of Transmitter Diversity using Intentional Frequency Offset for Wireless Communications", ECE Technical Reports, 1994.*

Liang Dong, Guanghan Xu and Hao Ling. *Prediction of Fast Fading Mobile Radio Channels in Wideband Communication Systems.* IEEE 2001.

Raphael J. Lyman and William W. Edmonson; *Decision-Directed Tracking of Fading Channels Using Linear Prediction of the Fading Envelope.* IEEE 1999.

Tugay Eyceoz, Alexandra Duel-Hallen and Hans Hallen; *Deterministic Channel Modeling and Long Range Prediction of Fast Fading Mobile Radio Channels,* 1998 IEEE.

Jiqing Han, Munsung Han, Gyu-Bong Park, Jeongue Park, Wen Gao and Doosung Hwang; *Discriminative Learning of Additive Noise and Channel Distortions for Robust Speech Recognition,* 1998 IEEE.

Xavier Menendez-Pidal, Ruxin Chen, Duanpei Wu and Mick Tanaka; *Front-End Improvements to Reduce Stationary & Variable Channel and Noise Distortion in Continuous Speech Recognition Tasks,* Eurospeech 1999.

* cited by examiner

METHOD AND SYSTEM FOR PREDICTING SIGNAL POWER TO INTERFERENCE METRIC

FIELD OF THE INVENTION

The present invention relates to methods and systems for the prediction of signal power to interference metrics.

BACKGROUND OF THE INVENTION

High-speed packet data systems rely on carrier-to-interference power ratio (C/I) or signal-to-noise plus interference ratio (SINR) prediction (as is known, C/I and SINR may differ only by a constant factor, and both terms are usually used interchangeably) to efficiently utilize air capacity and reliably deliver the highest speeds possible. If the C/I prediction were not accurate, it would either cause packet delivery errors or waste system resources. For the EV-DO system, the prediction is performed at the mobile station. The mobile station measures channel conditions and predicts the future channel conditions when the expected packet is delivered. For the EV-DV system, the prediction is done at the base station. Here, the mobile station reports C/I measurements to the base station, and the base station predicts the future C/I value for when a scheduled packet is to be transmitted.

The quality of C/I prediction is even more important in systems utilizing phase sweep transmit diversity (PSTD). PSTD was designed to improve temporal diversity by exploiting the spatial diversity of transmit antennas to create faster varying channels. In a PSTD system, the transmit antennas transmit an energy-focused beam across their associated sector at a sweeping frequency. The sweeping frequency imposes additional channel variations on top of the variations induced by movement of mobile stations, and with periodic scanning of the sector, PSTD has the potential to provide fairer channel usage. However, the success of such a system depends on accurately predicting the C/I or SINR.

SUMMARY OF THE INVENTION

The present invention provides methods and systems for predicting a signal power to interference metric for a communication channel in a coverage area of a phase sweep diversity communication system.

In one exemplary embodiment of the present invention, the communication channel is characterized using an autocorrelation function, which is determined based on a sweep frequency for transmissions in the coverage area. From the autocorrelation function, a prediction filter is derived, and using the prediction filter and the pilot signal, a channel estimate prediction is made. The signal power to interference metric is then determined from the channel estimate.

In another exemplary embodiment, previous signal power to interference metric values are used to determine a future or predicted signal power to interference metric. For example, in one embodiment, the signal power to interference metric is predicted based on an adaptive weighting of a current signal power to interference metric value and an average of previous signal power to interference metric values. The adaptive weighting may be based on a coefficient determined based on at least one previous signal power to interference metric value.

In one exemplary embodiment, the signal power to interference metric is a carrier-to-interference ratio, and in another exemplary embodiment, the signal power to interference metric is a signal-to-noise plus interference ratio.

BRIEF DESCRIPTION OF THE DRAWINGS

Embodiments of present invention will become more fully understood from the detailed description and the accompanying drawings, wherein.

DETAILED DESCRIPTION OF EXEMPLARY EMBODIMENTS OF THE PRESENT INVENTION

Figure 1:
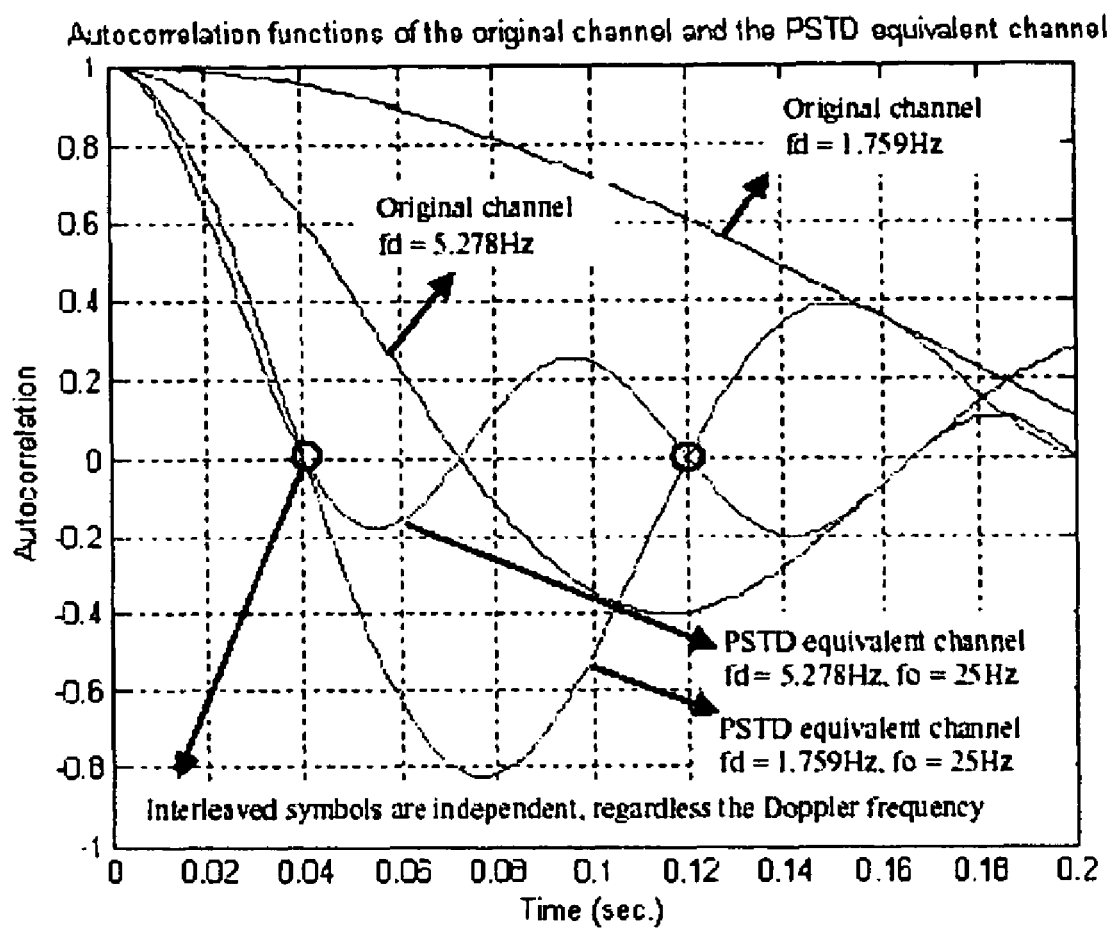
FIG. 1 is a plot of the autocorrelation function of an original channel and a PSTD equivalent channel in accordance with exemplary embodiments of the invention.

The following description of exemplary embodiments is merely illustrative in nature and is in no way intended to limit the invention, its application, or uses. The exemplary embodiments describe below an optimal C/I or SINR prediction embodiment, a sub-optimal C/I or SINR prediction embodiment and a feedback based prediction embodiment. As discussed previously such predications aid in the assignment of data rates to a channel at a future time (or slot).

Predicting C/I for a PSTD system, in which its energy beams sweep throughout a sector at a sweeping frequency, is different from traditional channel C/I prediction. Rather than treating the original fading channel and the impact imposed by the PSTD separately, the exemplary embodiments in this invention use an equivalent channel to account for both PSTD and fading channels. In a PSTD system, the equivalent channel observed by the receiver is the sum of two phase-rotated (due to PSTD) Gaussian multiplicative distortions (due to fading). Since it is the sum of Gaussian processes, the PSTD equivalent channel preserves a Gaussian distribution property. Furthermore, the phase rotations are deterministic and only induce a different 2nd moment characteristic, referred to herein as the autocorrelation function.

PSTD Equivalent Channel Autocorrelation Function and Spectrum

Prior to describing the exemplary embodiments of the present invention, the PSTD equivalent channel autocorrelation function and spectrum will be described. Let $h_1(t)$ and $h_2(t)$ respectively denote the complex Gaussian channel distortions on antenna 1 and antenna 2 of the transmitter at time t, and s(t) denote the transmitted symbol. Considering the symmetric implementations of PSTD, where the same, but opposite in direction phase rotation is imposed on both antennas, the received signal "r(t)" can then be expressed as:

$$r(t) = \frac{1}{\sqrt{2}}[h_1(t)e^{j(2\pi(f_0/2)t+\phi)} + h_2(t)e^{-j(2\pi(f_0/2)t)}]s(t) + n(t) \quad (1)$$

where $f_0$ is the sweeping frequency, $\phi$ is the initial phase offset between the two antennas, and n(t) is the additive white Gaussian noise (AWGN). The PSTD equivalent channel distortion can hence be written as:

$$h(t) = \frac{1}{\sqrt{2}}[h_1(t)e^{j(2\pi(f_0/2)t+\phi)} + h_2(t)e^{-j(2\pi(f_0/2)t)}] \quad (2)$$

The autocorrelation function of the PSTD equivalent channel can be derived as:

$$\begin{aligned}R_{hh}(t,\tau) &= E\{h(t)h^*(t-\tau)\} \\ &= \frac{1}{2}\left[R_{h_1h_1}(\tau)e^{jf_0^{\pi\tau}} + R_{h_2h_2}(\tau)e^{-jf_0^{\pi\tau}} + \right.\\ &\quad \left. R_{h_1h_2}(\tau)e^{j(2f_0^{\pi t}-f_0^{\pi\tau+\phi})} + R_{h_2h_1}(\tau)e^{-j(2f_0^{\pi t}-f_0^{\pi\tau+\phi})}\right] \\ &= \sigma^2 J_0(2\pi f_d\tau) + \\ &\quad \frac{1}{2}\left[R_{h_1h_2}(\tau)e^{j(2f_0^{\pi t}-f_0^{\pi\tau+\phi})} + R_{h_2h_1}(\tau)e^{-j(2f_0^{\pi t}-f_0^{\pi\tau+\phi})}\right]\end{aligned} \quad (3)$$

where the channel property $R_{h_1h_1}(\tau) = R_{h_2h_2}(\tau) = \sigma^2 J_0(2\pi f_d\tau)$ is applied, $\sigma^2$ is the power of the original channel, $J_0$ denotes the Bessel function of the 1st kind with 0th order, $f_d$ is the Doppler frequency, and $\tau$ is the delay quantity, i.e. the elapsed time between 2 points of interest in the fading process. The autocorrelation function not only can depend on the delay quantity $\tau$ but also can depend on the specific time t, which makes the autocorrelation function time-variant. The Doppler spectrum can be computed by taking the Fourier transform of the autocorrelation function with respect to $\tau$ for a fixed time t. The corresponding spectrum is also time-variant.

When a channel is spatially independent, i.e. $R_{h_1h_2}(\tau) = R_{h_2h_1}(\tau) = 0$, the autocorrelation function reduces to:

$$R_{h_1h_1}(\tau)\cos(\pi f_0\tau/2) = \sigma^2 J_0(2\pi f_d\tau)\cos(\pi f_0\tau) \quad (4)$$

Equation (4) illustrates that the simplified autocorrelation is time-invariant and by changing the sweeping frequency, the autocorrelation of the equivalent channel can be reduced, making the equivalent channel look as though a higher-mobility environment exists. With a predetermined sweeping frequency, one can choose an interleaving depth such that the cosine term in the equation is near zero. This can result in the independence of the interleaved symbols (and hence achieve temporal diversity) regardless of the mobile's moving velocity. A greater interleaving depth is generally required for low mobility in the original non-PSTD channel. An example of autocorrelations of the original channel and the PSTD equivalent channel in accordance with exemplary embodiments of the invention are plotted in FIG. 1.

The autocorrelation of the PSTD equivalent channel can be the original autocorrelation multiplied by a cosine-term. The Doppler spectrum of the equivalent channel is hence the sum of shifted and magnitude-halved spectrums of the original channel. The magnitude of the spectrum of the original channel is:

$$|S(f)| = \frac{\sigma^2}{\pi\sqrt{f_d^2 - f^2}}, \quad (5)$$

Hence, the PSTD equivalent channel spectrum is obtained as:

$$|S(f)| = \frac{\sigma^2}{\pi\sqrt{f_d^2 - (f-f_0/2)^2}} + \frac{\sigma^2}{\sqrt{f_d^2 - (f+f_0/2)^2}} \quad (6)$$

Figure 2:
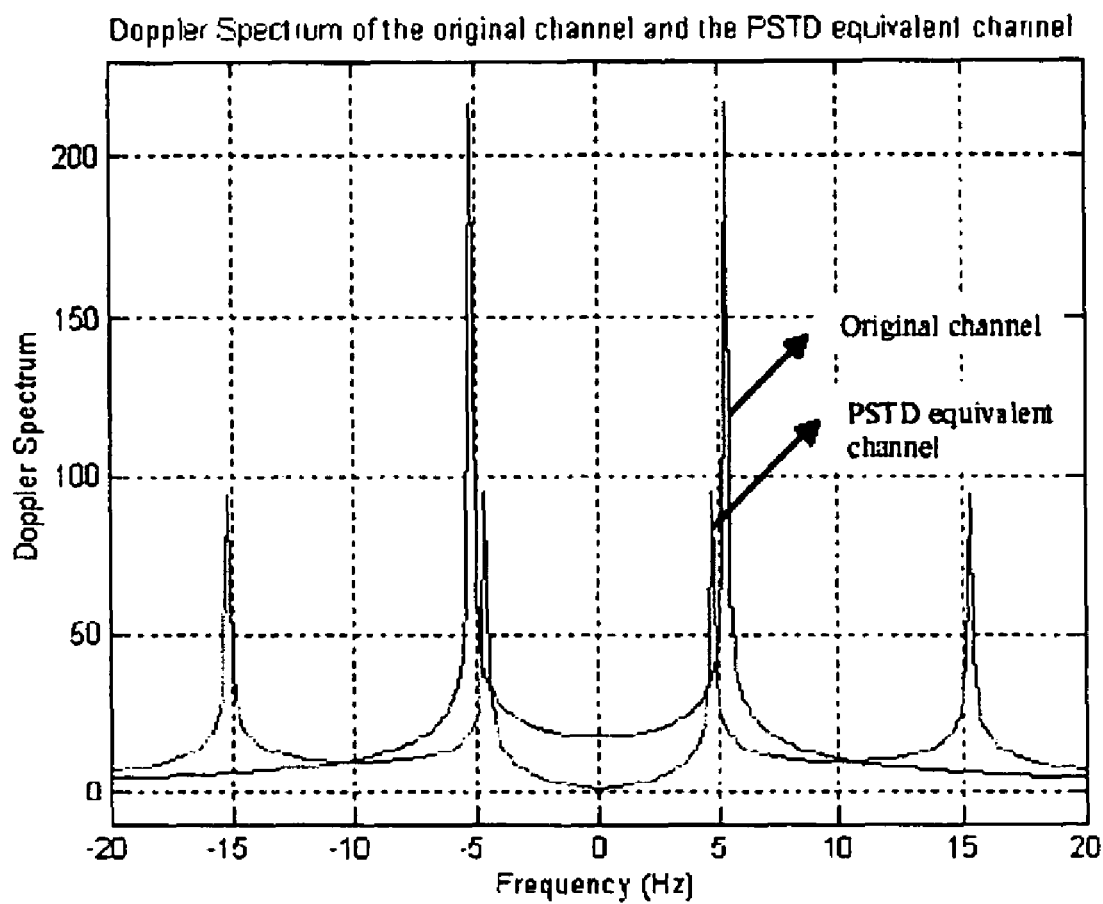
FIG. 2 is a plot of the Doppler spectrum of the original channel and the PSTD equivalent channel in accordance with exemplary embodiments of the invention.

The Doppler spectrums of the original channel and the PSTD equivalent channel, in accordance with exemplary embodiments of the invention, are shown in FIG. 2. Note that a wider bandwidth of the Doppler spectrum indicates that the PSTD equivalent channel varies faster than the original channel. The single-side bandwidth increases from $f_d$ to $(f_d+f_0/2)$.

When the spatial channels are not independent, the time-variant term within the autocorrelation function of the PSTD equivalent channel (3), i.e.

$$\frac{1}{2}\left[R_{h_1h_2}(\tau)e^{j(2f_0^{\pi t}-f_0^{\pi\tau+\phi})} + R_{h_2h_1}(\tau)e^{-j(2f_0^{\pi t}-f_0^{\pi\tau+\phi})}\right],$$

is not zero, and the whole process becomes time-variant, which eliminates the wide-sense-stationary (WSS) property that the original channel holds. A random process is said to have WSS property if its 1st and 2nd moment statistics (i.e. mean and autocorrelation) do not vary with respect to time. A design problem can be greatly simplified in a communication system if the WSS property holds. The above equation dictates that the overall spectrum of this time-variant portion will be the sum of the shifted and rotated spectrums of $R_{h_1h_2}(\tau)$ and $R_{h_2h_1}(\tau)$ to $-f_0/2$ to $f_0/2$.

The autocorrelation function is the sum of both time-invariant and time-variant components. When the spatial channels are highly correlated, the overall spectrum can become zero everywhere periodically. This is because the spectrums of the time-invariant and the time-variant components experience opposite phases periodically and cancel each other.

The analysis of the impact of time-variant terms is difficult and depends on the cross correlations (across both space and time). $R_{h_1h_2}(\tau)$ and $R_{h_2h_1}(\tau)$, which lack the nice properties that are valid in the autocorrelation function, such as $R_{h_1h_1}(\tau) = R_{h_1h_1}(-\tau)$ and $R^*_{h_1h_1}(\tau) = R_{h_1h_1}(\tau)$. Fortunately, when the antenna separation is very small, a good approximation can be applied and yields:

$$R_{h_1h_2}(\tau) \approx \sigma^2 \cdot e^{j\cdot\eta} \cdot J_0(2\pi f_d\tau); \text{ and} \quad (7)$$

$$R_{h_2h_1}(\tau)=R^*_{h_1h_2}(-\tau)\approx\sigma^2\cdot e^{j\cdot\eta}\cdot J_0(2\pi f_d\tau) \qquad (8)$$

where η is the phase offset between the two transmit antennas caused by the propagation delay. The approximation suggests that at high spatial correlations, the cross-correlation can be expressed as the product of the temporal and the spatial correlation without having to consider the interaction between space and time. Due to the high spatial correlation, the temporal correlation resembles that of a single antenna, and the spatial correlation is simply the phase rotation caused by the propagation delay.

Thus, in accordance with an exemplary embodiment using the approximation, the entire autocorrelation function can be rewritten as:

$$\begin{aligned}R_{hh}(t,\tau) &\approx \sigma^2\cdot J_0(2\pi f_d\tau)\cdot\cos(\pi f_0\tau)+ \\ &\quad \sigma^2\cdot J_0(2\pi f_d\tau)\cdot\text{Re}\{e^{j(2\pi f_0 t-\pi f_0\tau+\phi)}\} \\ &\approx \sigma^2\cdot J_0(2\pi f_d\tau)\cdot[\cos(\pi f_0\tau)+ \\ &\quad \cos(-\pi f_0\tau+2\pi f_0 t+\eta+\phi)] \\ &\approx 2\cdot\sigma^2\cdot J_0(2\pi f_d\tau)\cdot\cos(\pi f_0\tau-\pi f_0 t-\theta)\cdot\cos(\pi f_0 t+\theta)\end{aligned} \qquad (9)$$

where $\theta=(\eta+\phi)/2$ groups the initial sweeping phase and the propagation-delay phase into a single variable. In exemplary embodiments of the invention, the definition of un-normalized autocorrelation, $R_{hh}(t,\tau)\approx E\{h(t)h^*(t-\tau)\}$, is used and the magnitude of the autocorrelation can be greater than 1 under the spatially correlated case. This does not affect the generality, as a normalization factor can always be applied without affecting the invention.

Since $\cos(\pi f_0\tau-\pi f_0 t-\theta)$ shifts the spectrum the same way as $\cos(\pi f_0\tau)$ does in the spatially independent channel case with only a phase offset (time-dependent) imposed, the magnitude of the spectrum can be written as:

$$|S(t,f)|= \frac{\sigma^2|\cos(\pi f_0 t+\theta)|}{\pi}\cdot\left[\frac{1}{\sqrt{f_d^2-(f-f_0/2)^2}}+\frac{1}{\sqrt{f_d^2-(f+f_0/2)^2}}\right] \qquad (10)$$

Note that the spectrum is time-variant, and can become 0 at a certain time. This corresponds to the moment when the mobile is located at the null of the sweeping beam.

Exemplary Embodiment of Optimal Predictor

Next, an optimal carrier-to-interference (C/I) ratio or signal-to-noise plus interference ratio (SINR) predictor will be described. As is known, the SINR and C/I only differ by a known constant. Also, as will be appreciated, the SINR or C/I prediction for a sector may be readily obtained once the fading channel predictions or estimates for the sector and the neighboring sectors are obtained. Accordingly obtaining the fading channel estimate according to an exemplary embodiment of the present invention will first be described in detail below in reference to FIG. 10.

Figure 10:
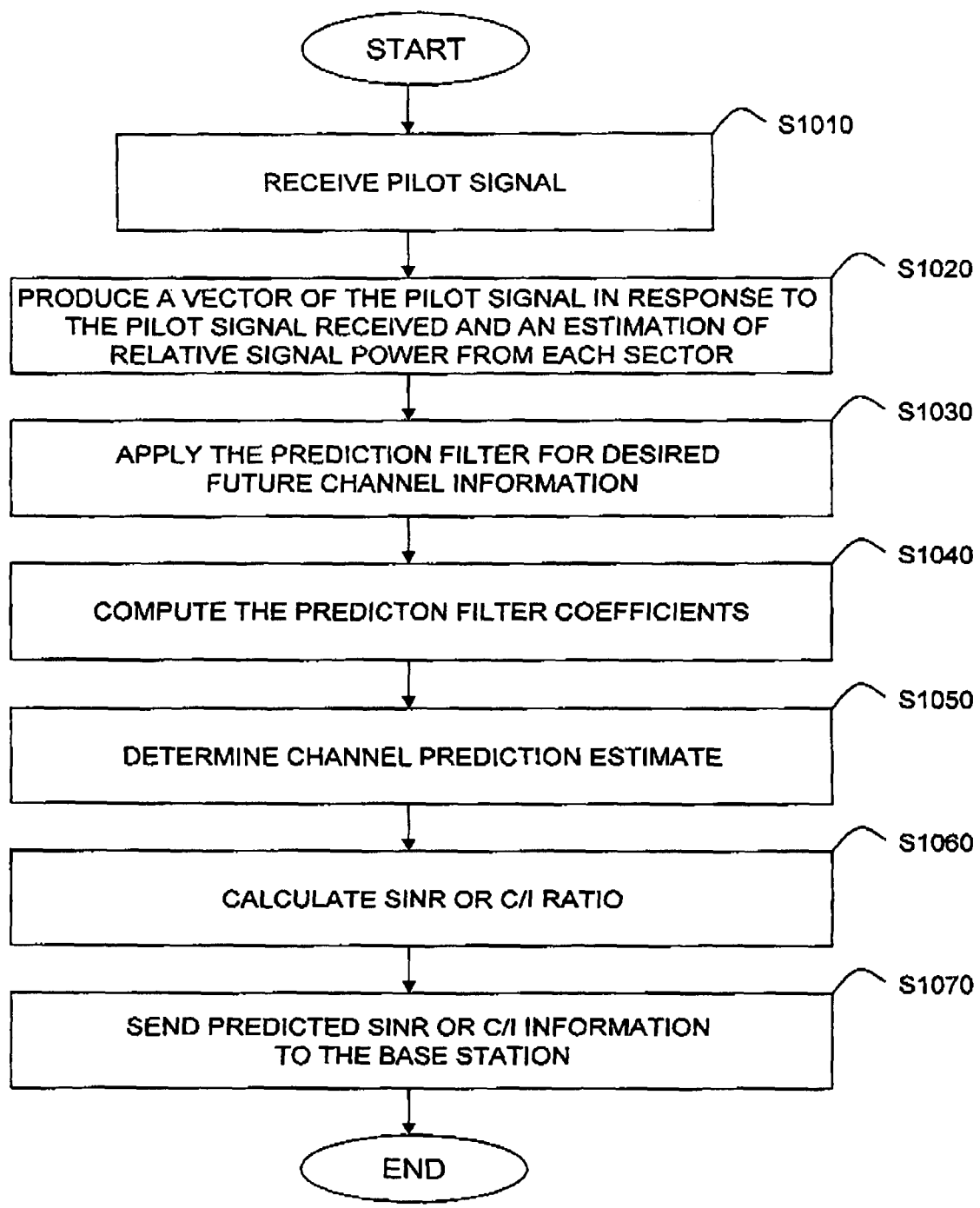
FIG. 10 is a flow diagram for predicting the SINR or C/I in wireless fading channels in accordance with exemplary embodiments of the present invention.

FIG. 10 is a flow diagram for predicting the SINR or C/I in wireless fading channels in accordance with exemplary embodiments of the present invention. In S1010, $\vec{y}(t)=[p(t-(L-1)T),p(t-(L-2)T),\ldots,p(t-2T),p(t-T),p(t)]^T$ is a vector of the pilot signals received by the mobile station, and $\vec{x}(t)=[h(t-(L-1)T),h(t-(L-2)T),\ldots,h(t-2T),h(t-T),h(t)]^T$ is the corresponding vector of channel distortions, where T is the sampling period and L is the sample window size. The In S1020, the received pilot signal is $\vec{y}(t)=\vec{h}(t)+\vec{n}(t)$, where $\vec{n}(t)$ is a vector of additive white Gaussian noise. The optimal predictor requires the estimation of the relative signal power from each sector. The sum of powers from sectors other than the desired sector constitutes the interference. In a code division multiple access (CDMA) system, all the signal sources can be separated to a certain degree after despreading and with a channel estimation moving average. As a result, the same prediction filter (discussed in detail below) can be applied on every sector to obtain the interference estimate.

In S1030, h(t+m·T) is the desired future channel information, where 'm' is an integer value of the chosen offset from the current slot at which the channel prediction is being made. The corresponding received pilot signal is p(t+m·T)=h(t+m·T)+n(t+m·T). Due to the property of Gaussian distribution, the optimal predictor can be written as $\hat{h}(t+m\cdot T)=\vec{w}^H\cdot\vec{y}(t)$, where $\vec{y}(t)$ is the vector of the received pilot block and $\vec{w}^H$ is the prediction filter. The prediction filter $\vec{w}^H$ can be obtained by applying the well-known Wiener-Hopf equation:

$$\begin{aligned}\vec{w}^H &= E\{p(t+mT)\cdot\vec{p}^H(t)\}\cdot E\{\vec{p}(t)\cdot\vec{p}^H(t)\}^{-1} \\ &= E\{h(t+mT)\cdot\vec{h}^H(t)\}\cdot\left(E\{\vec{h}(t)\cdot\vec{h}^H(t)\}+N_0\cdot I_{L\times L}\right)^{-1} \\ &= [R_{hh}((m+L-1)T)\ R_{hh}((m+L-2)T)\ R_{hh}((m-1)T)\ R_{hh}(mT)]\times \\ &\quad \begin{bmatrix} R_{hh}(0)+N_0 & R_{hh}(T) & L & R_{hh}((L-2)T) & R_{hh}((L-1)T) \\ R_{hh}(T) & R_{hh}(0)+N_0 & L & R_{hh}((L-3)T) & R_{hh}((L-2)T) \\ M & M & O & M & M \\ R_{hh}((L-2)T) & R_{hh}((L-3)T) & L & R_{hh}(0)+N_0 & R_{hh}(T) \\ R_{hh}((L-1)T) & R_{hh}((L-2)T) & L & R_{hh}(T) & R_{hh}(0)+N_0 \end{bmatrix}\end{aligned} \qquad (11)$$

where $_0N$ is the additive noise power, and $I_{L \times I}$ is an identity matrix of size L. The expected values of each component can be obtained by substituting appropriate time indices in the autocorrelation function.

The mean square error (MSE) is computed as $$E\{|\hat{h}(t+m \cdot T) - h(t+m \cdot T)|^2\} = E\{|\bar{\omega}^H \cdot \bar{p}(t) - h(t+m \cdot T)|^2\} = \quad (12)$$
$$\bar{\omega}^H \cdot \left( E\{\bar{h}(t) \cdot \bar{h}^H(t)\} + N_0 \cdot I_{L \times L} \right) \cdot \bar{\omega} -$$
$$2\text{Re}\{\bar{\omega}^H \cdot E\{\bar{h}(t) \cdot h^*(t+mT)\}\} + E\{|h(t+mT)|^2\}$$

Accordingly, in S1040 the prediction filter coefficients (matrix elements) can be computed by applying equation (4) when calculating equation (11). Referring back to equation (4), each of the variables, except the sweeping frequency, are known or measured at the mobile station. Accordingly, for the mobile station to perform the C/I or SINR prediction, the mobile station is informed of the sweeping frequency. In one exemplary embodiment, the base station broadcasts the sweeping frequency of a given sector periodically to the mobile stations in that sector. As another example, the broadcasting may occur during a mobile station's setup messaging when a call is initiated. The system is compatible with a non-PSTD system, as it only needs to broadcast a 0 sweeping frequency.

Figure 3:
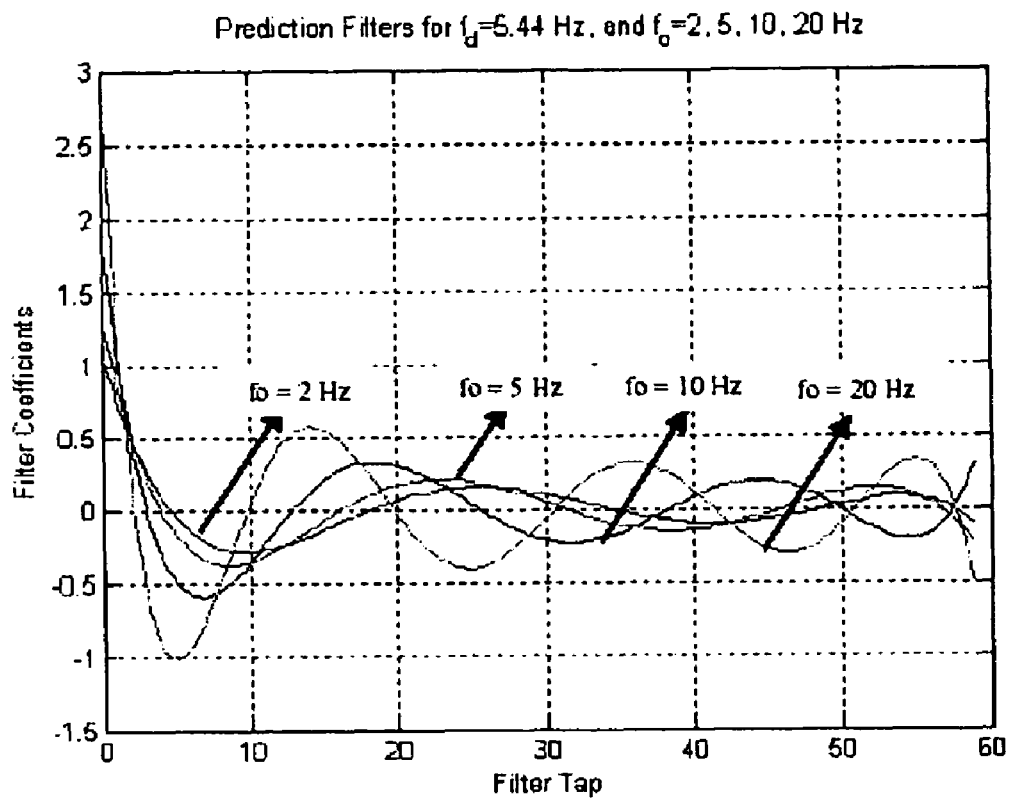
FIG. 3 is a plot of minimum mean square error (MMSE) channel prediction filter coefficients for a Doppler frequency of 5.44 Hz, a $5^{th}$ slot index prediction, and varying sweep frequencies in accordance with exemplary embodiments of the invention.
Figure 4:
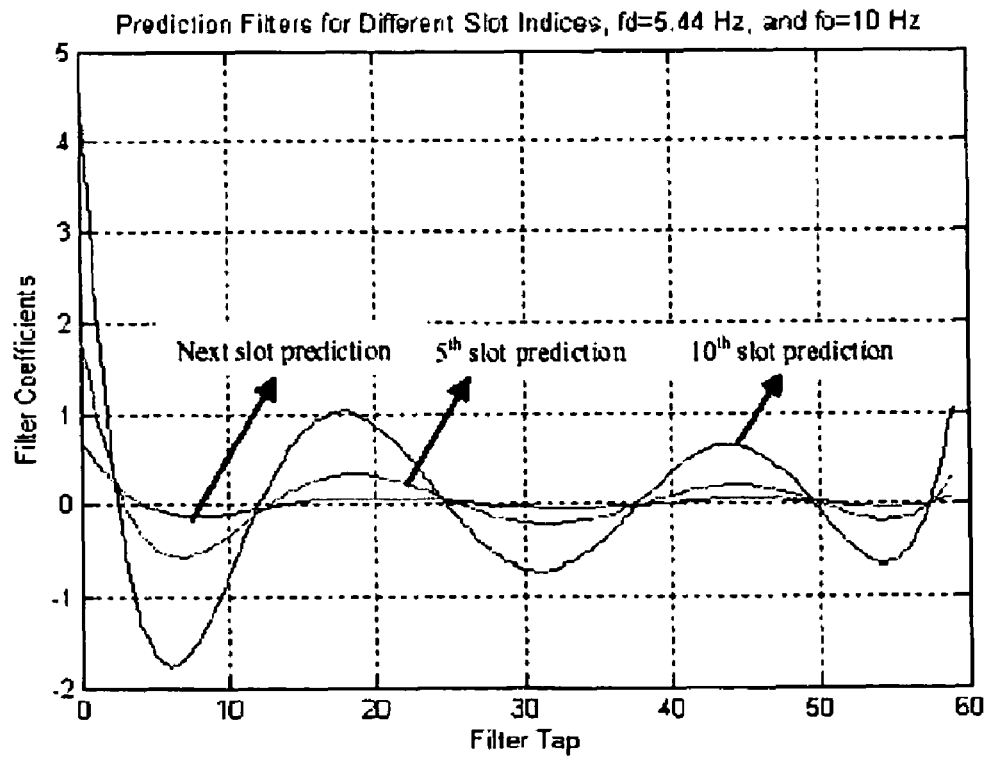
FIG. 4 is a plot of the MMSE channel prediction filter coefficients for a Doppler frequency of 5.44 Hz, a sweep frequency of 10 Hz and varying slot indices in accordance with exemplary embodiments of the invention.

FIG. 3 shows an example set of filter coefficients, in accordance with the invention, corresponding to different sweeping frequencies with Doppler frequency equal to 5.44 Hz (3 km/hr, carrier frequency=1.96 GHz) for predicting the channel of a fifth slot from the current slot. The values of $\sigma^2=1$ and $N_0=10^{-5}$ were used to generate the plot, the sampling period (slot period) was 1/600 second, and the number of filter taps is 60. FIG. 4 shows the MMSE filters of different future slots. Here, the sweeping frequency was set to be 10 Hz. The filter coefficients tend to have a bigger swing when the prediction is possibly less accurate, such as when the sweeping frequency is higher or when a long-shot prediction is targeted.

With the spatially independent channel assumption, the MSE of (12) may be further simplified to:

$$\sigma^2 - E\{h(t+mT) \cdot \bar{h}^H(t)\} \cdot (E\{\bar{h}(t) \cdot \bar{h}^H(t)\} + N_0 \cdot I_{L \times L})^{-1} E\{h(t+mT) \cdot \bar{h}^H(t)\}^H \quad (13)$$

In S1050, having obtained the filter coefficients for the prediction filter $\bar{\omega}^H$ using equation (11), the mobile station then determines the channel prediction as $\hat{h}(t+m \cdot T) = \bar{\omega}^H \cdot \bar{p}(t)$. Then in S1060, having obtained the channel prediction h(t+m·T), the SINR, and thus substantially the C/I ratio, may be calculated as:

$$\frac{|\hat{h}_j(t+m \cdot T)|^2}{\sum_{i=1, i \neq j}^{N} |\hat{h}_i(t+m \cdot T)|^2 + N_0} \quad (14)$$

where j is assumed to be the index of the desired sector, N is the total number of active sectors to be considered, and No is the AWGN power In S1070 the mobile station then feeds back this predicted SINR information to the base station.

Figure 5:
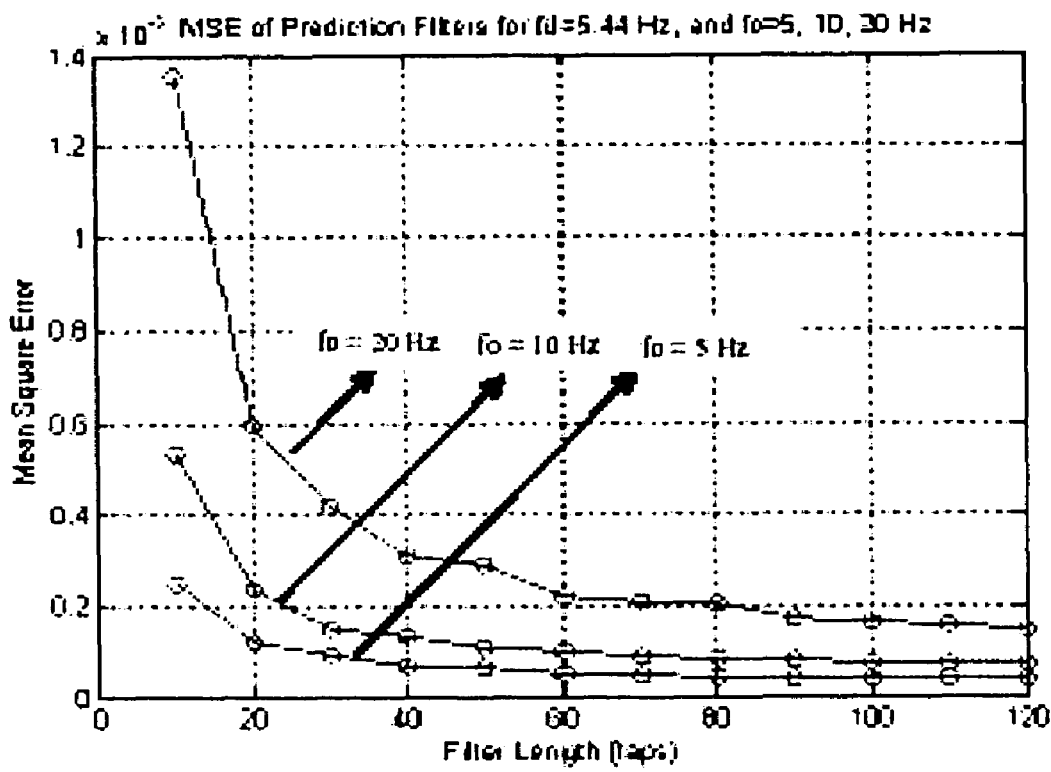
FIG. 5 is a plot of a mean square error (MSE) of channel prediction filters for a Doppler frequency of 5.44 Hz, and varying sweep frequencies in accordance with exemplary embodiments of the invention.

FIG. 5 shows the MSE performance, in accordance with exemplary embodiments of the invention, versus filter length for various sweeping frequencies. Using a larger filter length tends to provide a better performance, for example a filter length greater than 60 taps will generally give decent prediction performances.

Figure 6:
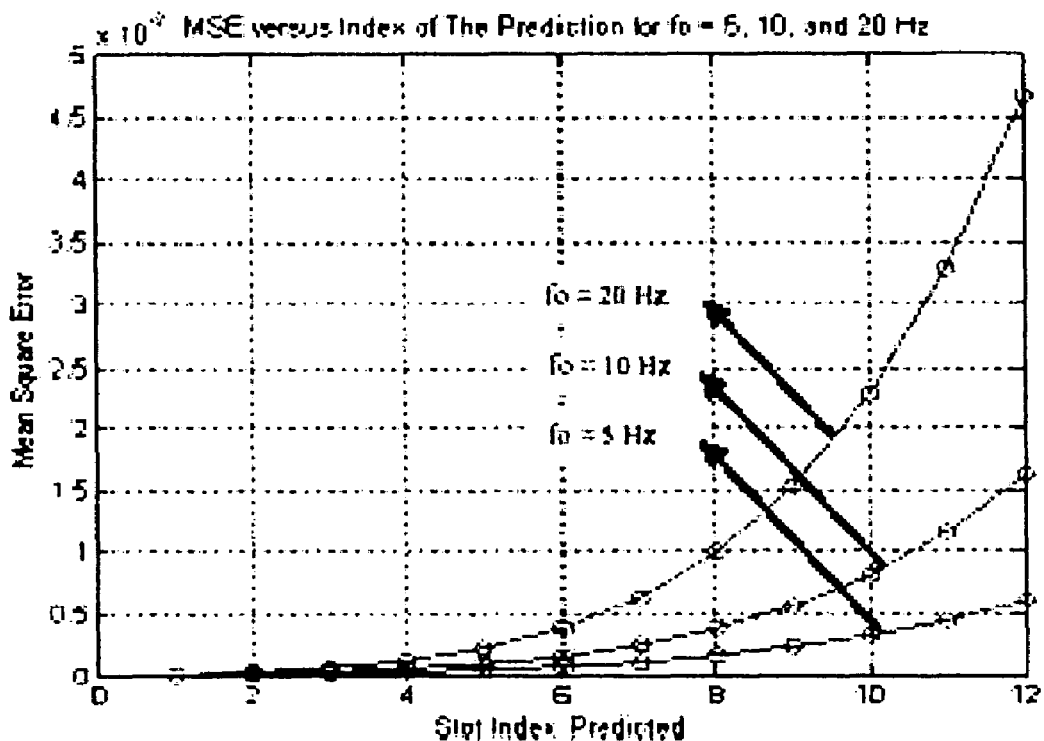
FIG. 6 is a plot of the MSE of channel prediction filters for a varying sweep frequency and varying predicted slot indices in accordance with exemplary embodiments of the invention.

FIG. 6 displays MSE performance, in accordance with exemplary embodiments of the invention, versus the predicted slot index (i.e., offset from the current slot for various sweeping frequencies. The error increases for larger slot predictions, and for larger sweeping frequencies.

Except for a different autocorrelation function, the similar development of the channel prediction filter in the spatially independent channel case can be applied in the spatially correlated channel case, in accordance with exemplary embodiments of the present invention. The prediction filter, and the corresponding MSE can be computed by applying equation (9) in equation (11), and then in (12), respectively. Since the function (prediction filter) is time-variant, the optimal MMSE prediction filter varies from time to time. In applying the autocorrelation function, not only the time difference "τ" between 2 symbols but also the specific time "t" must be considered. Since the time-dependent terms of the autocorrelation are sinusoidal, the phase of the first symbol in a block can be aggregated into θ while the rest of the symbols in the block simply reference to the first symbol. Hence, varying the variable θ suffices to investigate the impact of a different time.

The impact of filter mismatch can be investigated by computing the prediction filter coefficient with $\theta = \theta_w$ and the MSE with $\theta = \theta_{true}$, where $\theta_w$ is the value of phase used to generate the filter coefficient and $\theta_{true}$ is the value of the actual phase that occurred. In several simulations it was found that specifying $\theta = \theta_w$ constrains the filter to respond optimally only when $\theta_w = \theta_{true}$ or $\theta_w = \theta_{true} + \pi$ (i.e., when the adopted phase value for generating the filter and the true phase value are exactly the same or differ by π), and the filter is not as robust for other cases in the sense that unexpected degradations can be caused by simply varying the sweeping frequency or changing the filter length.

Since the optimal prediction filter for the case of spatially correlated channels is sensitive to the accuracy of the design parameters, the optimal filter designed for spatially independent channels may be adopted in the spatially correlated case. In other words, the filter designed for spatially independent channels may be used in all cases regardless of whether the channels are spatially correlated or independent. The filter designed for the spatially independent channels produces the optimal performance for the spatially independent case, but only provides a sub-optimal performance for the spatially correlated case. The loss due to the sub-optimality, however, is not significant as far as the SINR prediction is concerned.

Figure 7:
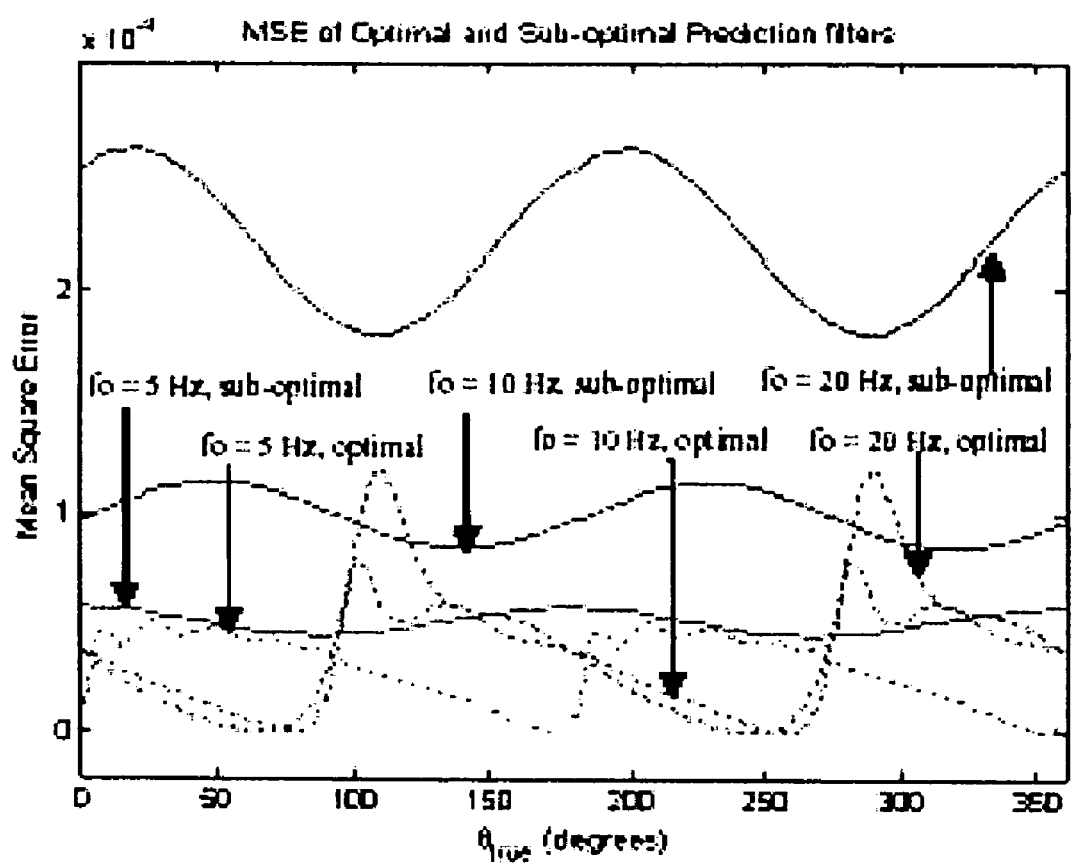
FIG. 7 is a comparison plot of the MSE of optimal and sub-optimal prediction filters for a varying sweep frequency and varying average sweep and propagation phase in accordance with exemplary embodiments of the invention.

According to an exemplary embodiment of the invention, equation (12) can be used in computing the MSE performance of the above described sub-optimal predictor in the case of spatially correlated channels. In equation (12), the filter w is computed by applying equation (4) in equation (11), and the rest of the correlations in (12) are obtained by using equation (9). FIG. 7 shows the difference between the optimal predictor and the sub-optimal predictor. The MSEs of the sub-optimal predictors are greater than that of the optimal ones. Note that the MSE performance of the optimal predictor fluctuates in a more irregular format with respect to the parameter $\theta_{true}$, and the MSE can grow when the filter is mismatched.

Figure 8:
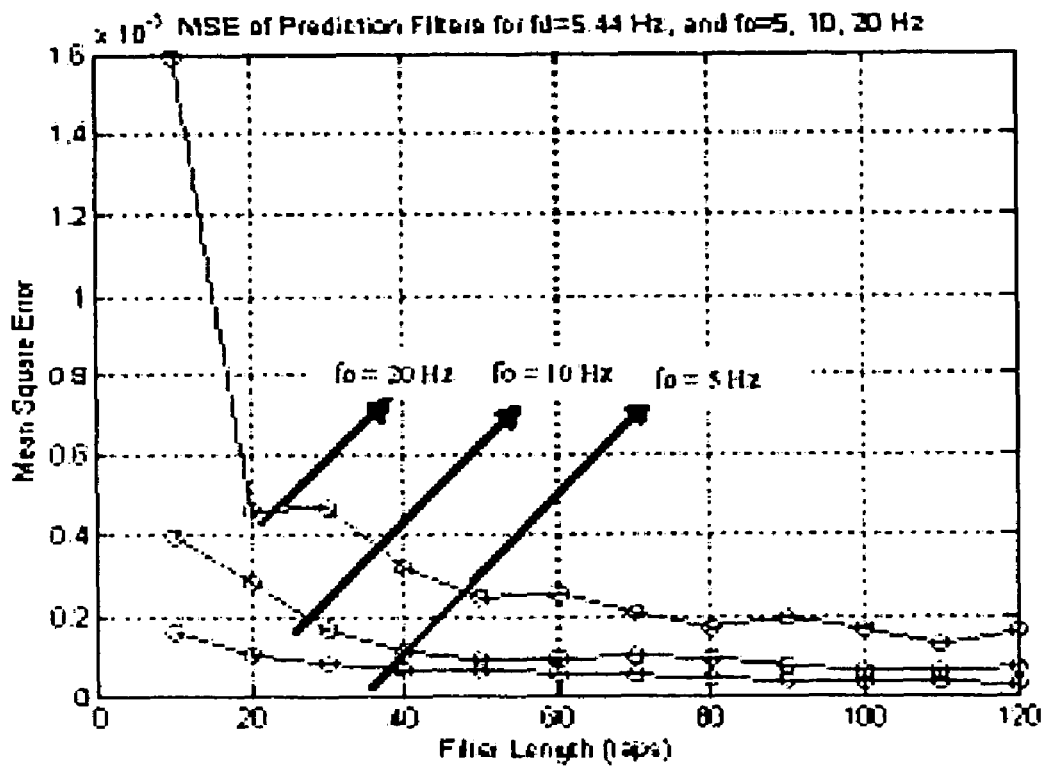
FIG. 8 is a plot of the MSE of sub-optimal prediction filters for a varying sweep frequency and varying filter lengths in accordance with exemplary embodiments of the present invention.
Figure 9:
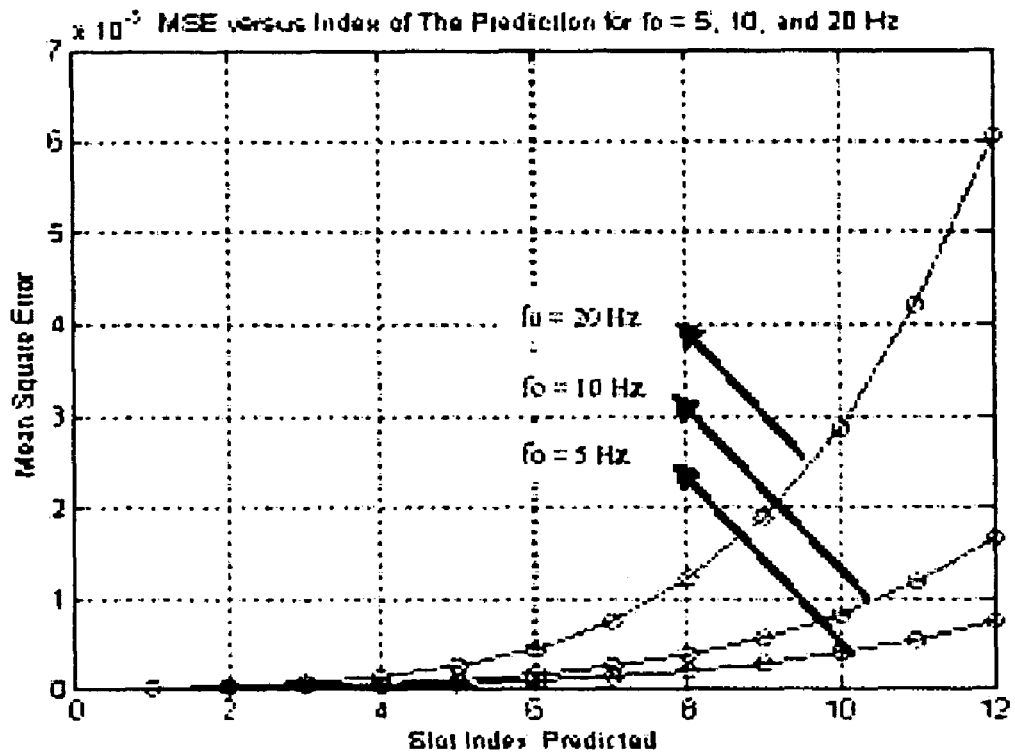
FIG. 9 is a plot of the MSE of sub-optimal prediction filters for a varying sweep frequency and varying predicted slot indices in accordance with exemplary embodiments of the present invention.

An example of the performance of the sub-optimal predictor, in accordance with exemplary embodiments of the invention, with respect to filter length is shown in FIG. 8 for various sweeping frequencies. Here, θ=0 is chosen to generate the result. It is seen that as the filter length increases, the MSE reduces as expected. This is not necessarily true if a filter is optimized for $\theta_w=0$ and operated on, say, $\theta_{true}=\pi/2$. FIG. 8 also shows that 60 taps may be a good choice of the filter length. FIG. 9 displays the MSE versus the length of prediction. A similar behavior to the spatially independent case is observed.

Exemplary Embodiment of a Feedback Based Predictor

Next, an exemplary embodiment of a feedback based SINR or C/I predictor will be described. According to this embodiment of the present invention, the predicted C/I ratio at time t will be expressed as Ctol_pred(i+d). Here, time t equals i+d, where "i" indicates the current time slot and "d" indicates the number of time slots before a data packet is scheduled for transmission. Remember that the SINR or C/I is being used to efficiently manipulate system resources for transmission of data packets. The predicted C/I ratio according to this embodiment is determined according to the following expression:

$$Ctol\_pred(i+d)=Ctol\_cur(i)*cc(d)+(1-cc(d))*Ctol\_avg(i) \quad (16)$$

where Ctol_avg(i) is the average C/I ratio measured by the mobile station over a moving window (e.g., average for C/I values for the $i^{th}$ to $(i-64)^{th}$ slots), Ctol_cur(i) is the measured current C/I value at time="i slot," and cc(d) is the channel coefficient at a given delay d. The channel coefficient is determined, according to one exemplary embodiment, as follows:

CC=0; Num1=0; Num2=0;
    for k=0:memLn−1
        CC=CC+Ctol_cur(i−k)*Ctol_cur(i−k−d);
        Num1=Num1+Ctol_cur(i−k)^2;
        Num2=Num2+Ctol_cur(i−k−d)^2;
    end
    cc(d)=CC/sqrt(Num1)/sqrt(Num2);

where memLn is the length of the measurements used to calculate the cc(d), which can be an arbitrary number. While this embodiment has been described above with respect to predicting the C/I ratio, it will be understood that this same technique may be used to predict the SINR.

The embodiment of the present invention have been described as implemented at the mobile station with feed back of the determined C/I or SINR to the base station. Alternatively, however, the necessary measurement made at the mobile station may be fed back to the base station, and the C/I (or SINR) prediction and/or channel prediction may be performed at the base station.

Exemplary embodiments of the present invention can use several methods, functions, and types of channels. Some of these include the autocorrelation of the PSTD equivalent channel, spatially independent channels, spatially correlated channels, etc. Additional methods, functions, and types of channels can be used within the scope of the invention.

The description of the invention is merely exemplary in nature and, thus, variations that do not depart from the gist of the invention are intended to be within the scope of the embodiments of the present invention. Such variations are not to be regarded as a departure from the spirit and scope of the present invention.

What is claimed is:

1. A method of predicting a signal power to interference metric, comprising:

determining an autocorrelation function for a communication channel based on a sweep frequency for transmissions in a coverage area of a phase sweep diversity communication system, the autocorrelation function having a time-variant component and a time-invariant component, the time-variant component being based on a phase offset between two antennas;

determining a prediction filter based on the sweep frequency and a succeeding time slot using the autocorrelation function;

determining a channel prediction of the communication channel based on the determined prediction filter; and predicting the signal power to interference metric based on the determined channel prediction at a radio device, the sweep frequency being the frequency at which at least one energy-focused beam is swept through the coverage area of the phase sweep diversity communication system.

2. The method of claim 1, wherein
the determining a channel prediction step determines the channel prediction of the communication channel based on the sweep frequency, the determined prediction filter, and a pilot signal.

3. The method of claim 1, wherein
the predicting the signal power to interference metric step determines the signal power to interference metric for the succeeding time slot.

4. The method of claim 1, wherein the determining an autocorrelation function step determines the autocorrelation function based upon previous channel information for the coverage area and the sweep frequency.

5. The method of claim 1, wherein the determining an autocorrelation function step determines the autocorrelation function based upon a Doppler frequency value of the coverage area and the sweep frequency.

6. The method of claim 1, wherein the signal power to interference metric is a carrier-to-interference ratio.

7. The method of claim 1, wherein the signal power to interference metric is a signal-to-noise plus interference ratio.

8. The method of claim 1, wherein the time-invariant component is based on a Bessel function, and the time-variant component is based on an equivalent channel distortion function.

9. The method of claim 8, wherein the autocorrelation function is, $$\sigma^2 J_0(2\pi f_d \tau) + \frac{1}{2}\left[R_{h_1 h_2}(\tau)e^{j\left(2f_0^{\pi 1} - f_0^{\pi \tau + \phi}\right)} + R_{h_2 h_1}(\tau)e^{-j\left(2f_0^{\pi 1} - f_0^{\pi \tau + \phi}\right)}\right],$$

wherein $\sigma^2$ denotes a power of an original channel, $J_0$ denotes a Bessel function of the 1st kind with 0th order, $f_d$ denotes a Doppler frequency, $\tau$ denotes a delay quantity, t denotes specific time, $f_0$ denotes a sweeping frequency, $\phi$ denotes an initial phase offset between two antennas, and $R_{h_1 h_2}$, $R_{h_2 h_1}$ denote a Fourier transform of characteristics at the two antennas.

10. A method of predicting a signal power to interference metric, comprising:

predicting at a radio device the signal power to interference metric based on a determined channel prediction, the predicting including, determining an autocorrelation function for the communication channel based on the sweep frequency, the determined autocorrelation function having a time-variant component and a time-invariant component, the time-variant component being based on a phase offset between two antennas, and determining a channel prediction of the communication channel based on the determined autocorrelation function, the determined channel prediction based on a sweep frequency for transmissions in a coverage area of a phase sweep diversity communication system, the sweep frequency being the frequency at which at least one energy-focused beam is swept through the coverage area of the phase sweep diversity communication system.

11. The method of claim 10, wherein the determined channel prediction being further based on a pilot signal.

12. The method of claim 10, wherein the predicting step further comprises:

determining a prediction filter for the communication channel based on the sweep frequency; and determining the channel prediction of the communication channel based on the determined prediction filter.

13. The method of claim 12, wherein the determining a channel prediction step determines the channel prediction of the communication channel based on the prediction filter and a pilot signal.

14. The method of claim 10, wherein the determining an autocorrelation function step determines the autocorrelation function based upon previous channel information for the coverage area and the sweep frequency.

15. The method of claim 10, wherein the determining an autocorrelation function step determines the autocorrelation function based upon a Doppler frequency value of the coverage area and the sweep frequency.

16. The method of claim 10, wherein the signal power to interference metric is a carrier-to-interference ratio.

* * * * *